Figure 1:
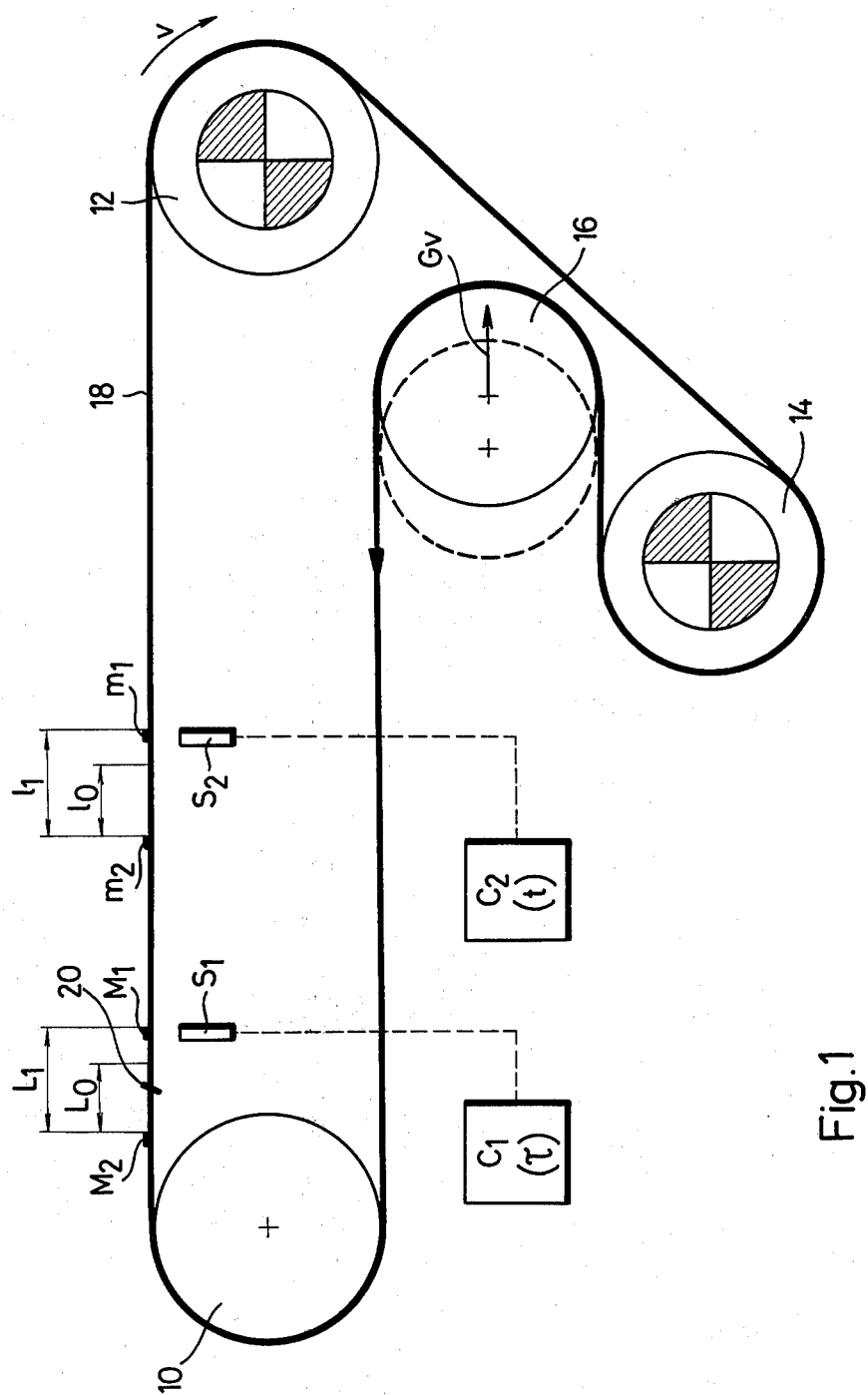

United States Patent [19]

Gombócz et al.

[11] 4,372,172
[45] Feb. 8, 1983

[54] PROCESS FOR MEASURING THE TIGHTNESS OF ENDLESS DRIVING MEANS DURING OPERATION

[75] Inventors: Károly Gombócz; József Korbuly; Geza Krampe; Jozsef Szatmári, all of Budapest; Károly Szöke, Kerepestarcsa, all of Hungary

[73] Assignee: Kozponti Banyaszati Fejlesztesi Intezet, Budapest, Hungary

[21] Appl. No.: 204,081

[22] Filed: Oct. 4, 1980

[51] Int. Cl.³ .............................................. G01L 5/10
[52] U.S. Cl. ...................................... 73/862.39; 73/7
[58] Field of Search ................. 73/862.39, 828, 159, 73/7; 33/127

[56] References Cited

U.S. PATENT DOCUMENTS 2,989,690  6/1961  Cook .................................. 73/159

FOREIGN PATENT DOCUMENTS

| 55-149805 | 11/1980 | Japan ................................. 33/127 |
| 914819 | 1/1963 | United Kingdom ............. 73/862.39 |
| 395733 | 8/1973 | U.S.S.R. ............................ 73/862.39 |
| 436974 | 7/1974 | U.S.S.R. ............................ 73/862.39 |
| 616529 | 7/1978 | U.S.S.R. ............................... 33/127 |

Primary Examiner—Charles A. Ruehl
Attorney, Agent, or Firm—Young & Thompson

[57] ABSTRACT

A process for measuring the tightness of endless driving members, particularly straps, belts, chains, ropes etc. during operation, in the course of which a signal is displayed. First and second spaced markings are applied onto the driving member. Along the path of the driving member at least one sensing element is arranged and at a constant speed of the driving device the time elapsing between the passing of the first and the second markings before the sensing element is measured.

2 Claims, 2 Drawing Figures

PROCESS FOR MEASURING THE TIGHTNESS OF ENDLESS DRIVING MEANS DURING OPERATION

The invention relates to a process for measuring the tightness of endless driving means during operation.

In general, for measuring the tightness of endless driving means during operation mainly indirect methods have been used up to now. The essence of the indirect method lies in that the supporting force of the bearings holding the shafts of the driving drum, drive sprocket etc. taking up the endless driving means is measured. Measuring can be performed by means of strain gauges, spring actuated, or hydraulic, piezoelectric crystalled, or inductive etc. dynamometers. These indirect methods enable but the estimation of the tightness of the driving means (belts, chains etc.) or of the changes thereof.

However, a direct method for measuring the tightness or driving means is also known, but due to the complicated, delicate and expensive features, this method is unsuitable for the application under operational circumstances (e.g. in mines). In this method, the sensing element formed as a strain-gauge is applied directly onto the driving means and the signals thereof are transmitted by a microminiature radio transmitter to the measuring and display unit. Due to the high costs, this method can be used only for measuring performed in laboratories.

The determination of the useful life to be expected for the belts of conveyors also used for passanger transport, i.e. forecasting the possible occurrence of a break is of utmost importance. In practice, it is tried to solve the problemm by performing destructive strength and fatigue tests, however, these methods are not at all reliable, since the actually used belts cannot be tested, merely conclusions may be drawn in respect to the characteristics.

The aim of the invention is to eliminate the above-mentioned drawbacks.

The object of the invention is to provide a process for measuring the tightness of endless driving means during operation, which can be realized in a relatively simple manner and also under onerous operational circumstances, delivering in case of need continuous information but simultaneously being suitable for performing periodic tests, measuring with due accuracy without disturbing operation and being suitable for gaining absolute and relative information.

The invention is the discovery that when an endless driving means is provided with two spaced markings and is driven at constant speed, then variations in the time required for the two markings to pass a given point will indicate variations in the length and hence the tightness of the endless driving means. Depending on prevailing circumstances and requirements, the two markings may be applied in the form of simple dyed strips (optically perceptible), or by means of material detectable by a radiation detector, or as inductively sensible magnetic substances.

In accordance with the perception described above, the task set may be solved by a process for measurng the tightness of endless driving means, particularly strips, belts, chains, ropes etc. during operation, in the course of which a signal is generated that varies as the tension in the driving means, which is—after having been transformed and amplified in a given case—displayed; in course of said process two markings, separated a distance from each other, are applied onto the driving means, furthermore along the path of the driving means at least a sensing element is arranged, and preferably at a constant speed the time elapsing between the passing of the first and second marking, respectively, before the sensing element is measured.

In a preferable form of the process according to the invention the first and the second markings are applied onto the driving means before and after the place of splicing.

In another preferable embodiment the first and second markings are applied onto the intact section of the driving means.

In a further preferable embodiment the interval between the passing of the first marking and the second marking, respectively, before the sensing element is measured by means of a chronometer started by the first marking and stopped by the second one.

In a further preferable embodiment the measured values of the intervals elapsing between the passing of the first and second marking, applied on the place of splicing and on the intact section, before the sensing element are compared and the difference and or the quotient thereof formed.

At last, in a further preferable embodiment of the invention two sensing elements are arranged along the path of the driving means, whereby the interval is measured, during which the first marking moves from the first sensing element to the second one.

The main advantage of the process according to the invention lies in that it enables direct measuring during operation in a simple manner and yields the possibility to predict the imminent danger of rupture. The measurng process does not disturb operation at all, in accordance with prevailing requirements continuous or periodical measuring becomes possible, in case of necessity accuracy can be increased, besides it becomes possible to forecast the occurence of a dangerous situation.

Figure 2:
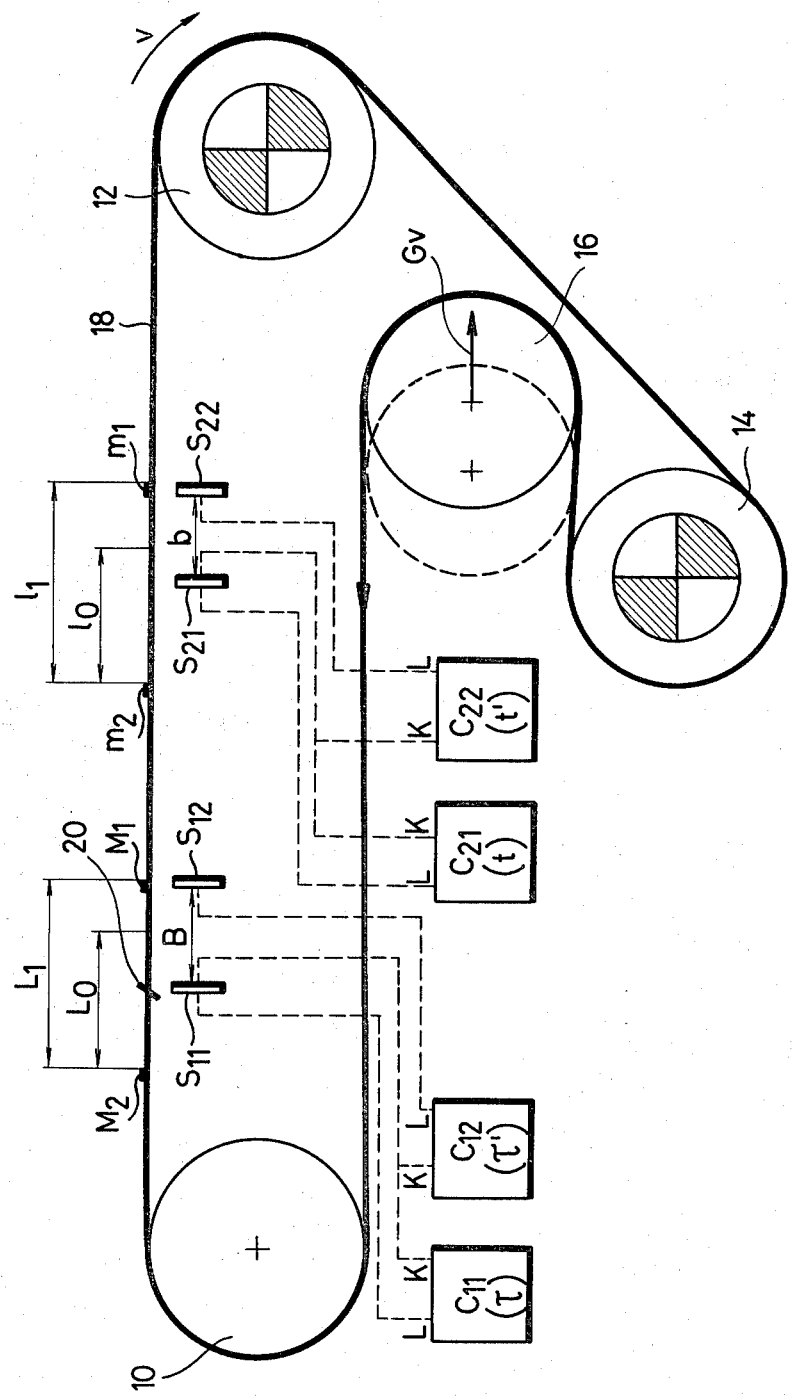

The invention is described in detail, by way of examples, with reference to preferred embodiments, illustrated in the accompanying drawings, wherein FIG. 1 is the schematic layout of the measuring system for measuring the tightness of endless driving means, using two times two markings and two times one sensing element, FIG. 2 is the schematic layout of the measuring system with two times two markings and two times two sensing elements.

In the measuring system according to FIG. 1 the endless driving means 18 (e.g. a rubber belt) is driven by a driving drum 10, and about a deflecting pulley 12, a tightening drum 16 and a reverse drum 14; the driving means is advancing in the direction indicated by the arrow with a speed v, the tightness of the driving means is altered by changing the tensile force $G_v$ of the tightening drum 16.

Before the splicing place 20 of the endless driving means 18 a first marking $M_1$, after said place a second marking $M_2$ is applied; in a new and unloaded state of the driving means 18 the distance between the two markings equals to $L_0$. The markings $M_1$ and $M_2$ may be simple dyed markings, but they can be made of magnetic, radiant etc. substances in accordance with the given circumstances. In the direction of advance, before the place 20 of splicing, onto the intact section of the driving means 18 a further first marking $m_1$ and a second marking $m_2$ are applied; the distance between said markings amounts in a new and unloaded state of the driving means 18 to $l_0$. Sensing elements $S_1$, $S_2$ are arranged in such a manner that the markings $m_1$, $M_1$ should approximately simultaneously pass before said sensing elements.

In course of service and due to tightening, the driving means 18 slacken; in this case between the markings $M_1$, $M_2$ and $m_1$, $m_2$ the distance equals to $L_1$, $l_1$.

Along the path of the driving means 18 the first sensing element $S_1$ and the second sensing element $S_2$ are arranged, which are functioning in dependence of the kind of the markings $M_1$, $M_2$, $m_1$, $m_2$ (e.g. in a light-reflective, inductive, capacitive, radiation-reflective mode of operation). The first sensing element $S_1$ is connected to a counter $C_1$, while the second sensing element $S_2$ is connected to a second counter $C_2$.

With the measuring system illustrated in FIG. 1 measuring is performed in such a manner that the first markings $m_1$, $M_1$ passing in the direction of advance beside the sensing elements $S_1$ and $S_2$, respectively, start the counters $C_1$, $C_2$, while the second markings $m_2$, $M_2$ stop them. In case of a constant speed v, the counters $C_1$, $C_2$ are always measuring a value, which is proportional to the distances $l_1$, $L_1$ between the markings $m_1$, $m_2$ respectively $M_1$, $M_2$, i.e. to the tightness of the intact (continuous) stretch and of the stretch containing place 20 of splicing of the driving means 17, whereby said value is preferably digitally displayed.

According to our tests, beside the streching force said value also characterizes the wear of the driving means 18, accordingly, by comparison with the reference values obtained in course of previous comparative measurings, the serviceableness of the driving means 18 can be quickly and simply stated, besides the danger of a rupture can be detected too.

It could be stated that in the environment of the place 20 of splicing the driving means slacken more than in the continuous section, whereby the ratio of the values of elongation are characteristic for the wear of the driving means 18. Comparison of the values may take place by substraction or division (it is needless to say, that arithmetic derivation of, say, the quotient may be performed by means of known electronical devices).

The system according to FIG. 2 differs from that illustrated in FIG. 1 in that two times two sensing elements and two times two counters are used, namely a first sensing element $S_{21}$ and a second sensing element $S_{22}$, arranged at a distance b from each other on the intact section, while a first sensing element $S_{11}$ and a second sensing element $S_{12}$ are arranged at a distance B from each other at the place of splicing. The sensing elements are arranged in such a manner, that the markings $m_1$, $M_1$ should pass approximately simultaneously before the sensing elements $S_{11}$, $S_{21}$.

The sensing element $S_{11}$ is connected to the starting input K of counters $C_{11}$ and $C_{12}$, as well as to the stopping input L of the counter $C_{11}$, while the sensing element $s_{12}$ is connected to the stopping input L of the counter $C_{12}$, the sensing element $S_{21}$ is connected to the starting input K of counters $C_{21}$ and $C_{22}$ and to the stopping input L of the counter $C_{21}$, whereas the sensing element $s_{22}$ is connected to the stopping input L of the counter $C_{22}$.

With the measuring system illustrated in FIG. 2 measuring takes place in such a manner, that the first marking $M_1$ passing before the first sensing element $S_{11}$ starts the counters $C_{11}$ and $C_{12}$, while the first marking $m_1$ passing before the first sensing element $S_{21}$ starts the counters $C_{21}$, $C_{22}$. As soon as the first markings $M_1$ and $m_1$ pass before the sensing elements $S_{12}$ resp. $S_{22}$, the counters $C_{12}$ and $C_{22}$ are stopped, and finally the markings $M_2$ and $m_2$ passing before the sensing elements $S_{11}$ and $S_{21}$, respectively, stop the counters $C_{11}$, $C_{21}$. In such a manner, the counter $C_{11}$ measures the time $\tau$, which elapses between the passing of the markings $M_1$ and $M_2$ before the sensing element $S_{11}$, while the counter $C_{21}$ is measuring the time t, which elapses between the passing of the markings $m_1$ and $m_2$ before the sensing element $S_{21}$. Simultaneously, the counter $C_{12}$ measures the time $\tau$, during which the marking $M_1$ moves from the sensing element $S_{11}$ to the sensing element $S_{12}$, while the counter $C_{22}$ measures the time $t'$, during which the marking $m_1$ moves from the sensing element $S_{21}$ to the sensing element $S_{22}$.

Supposing a constant speed v, the time $\tau$ is proportional to the distance $L_1$, the time $\tau$ to the distance B, the time t to the distance $l_1$, while the time $t'$ is proportional to the distance b.

By the application of the system according to FIG. 2 the influence of the speed v exerted on the measuring results may be eliminated, it can be namely demonstrated that at the place of splicing the extension $$\epsilon_1 = (L_1 - L_o)/L_c = K_1 \tau/\tau' - 1$$

while at the intact section it amounts to $$\epsilon_2 = (l_1 - l_o)/l_o = K_2 t/t' - 1$$

i.e. from the four time-values measured by means of four counters the extension values can be determined either separately or in relation to each other, i.e. based on a comparison with previous experimental data, the extent of wear of the driving means 18 can be stated.

The solution according to the invention makes it possible to control an automatic device for adjusting the optimal tightness, and in this way the useful life can be prolongated, simultaneously energy can be saved. On the basis of the measured values an alarm signal can be given or when a dangerous situation is to be feared, automatic stopping of the drive becomes possible.

We claim:

1. A method of monitoring ageing or wearing condition of a spliced endless driving means, which method comprises applying to a spliced endless driving means a pair of first markings ($M_1$, $M_2$) the shortest path between which includes the splice of the endless drive means, applying to said driving means a pair of second markings ($m_1$, $m_2$) the shortest path between which does not include said splice, measuring substantially simultaneously during use of the driving means:

(1) the time taken for said first pair of markings to pass through a position in which they are sensed by a first element ($S_1$) for sensing the presence of said first markings; and (2) the time taken for said second pair of markings to pass through a position in which they are sensed by a second element ($S_2$) for sensing the presence of said second markings;

thereafter determining the relation between times (1) and (2) and comparing the relation thus obtained with a permitted relation value.

2. A method according to claim 1, wherein two pairs of said sensing elements ($S_{11}$, $S_{12}$; $S_{21}$, $S_{22}$) are used, one pair including said first sensing element ($S_{11}$), the other pair including said second sensing element ($S_{21}$), and wherein there are additionally measured substantially simultaneously:

(3) the time taken for the first ($M_1$, $m_1$) of each respective pair of markings to pass from respective positions in which they are sensed respectively by the first sensing element ($S_{11}$) and the second sensing element ($S_{21}$) to positions in which they are sensed by the other ($S_{12}$, $S_{22}$) of the respective pair of sensing elements; and thereafter (4) determining the relation between times (1) and (3) for the first pair of markings, (5) determining the relation between times (1) and (3) for the second pair of markings, and determining the relation between relations of (4) and (5) and comparing the relation thus obtained with a permitted relation value.

* * * * *